United States Patent
Hong et al.

(10) Patent No.: US 10,735,967 B2
(45) Date of Patent: Aug. 4, 2020

(54) METHOD AND APPARATUS FOR CARRIER AGGREGATION USING AGGREGATION ENTITY

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/508,208

(22) PCT Filed: Sep. 4, 2015

(86) PCT No.: PCT/KR2015/009333
§ 371 (c)(1),
(2) Date: Mar. 2, 2017

(87) PCT Pub. No.: WO2016/036180
PCT Pub. Date: Mar. 10, 2016

(65) Prior Publication Data
US 2017/0289820 A1 Oct. 5, 2017

(30) Foreign Application Priority Data

Sep. 5, 2014 (KR) .................. 10-2014-0119263
Jul. 1, 2015 (KR) .................. 10-2015-0094021

(51) Int. Cl.
*H04W 4/00* (2018.01)
*H04W 16/14* (2009.01)
(Continued)

(52) U.S. Cl.
CPC .............. *H04W 16/14* (2013.01); *H04B 7/26* (2013.01); *H04W 28/021* (2013.01);
(Continued)

(58) Field of Classification Search
CPC .... H04W 16/14; H04W 28/021; H04W 80/02
See application file for complete search history.

(56) References Cited

U.S. PATENT DOCUMENTS 8,824,298 B2 9/2014 Gupta et al.
8,989,762 B1 3/2015 Negus et al.
(Continued)

FOREIGN PATENT DOCUMENTS

CN 102215530 A 10/2011
CN 105723668 A 6/2016
(Continued)

OTHER PUBLICATIONS

Intel Corporation, "Stage-2 details of WLAN/3GPP Radio Interworking for LTE", R2-143177, 3GPP TSG-RAN WG2 Meeting #87, Dresden, Germany, Aug. 18-Aug. 22, 2014, pp. 1-2.
(Continued)

*Primary Examiner* — Abdelnabi O Musa
(74) *Attorney, Agent, or Firm* — IP Legal Services, LLC

(57) ABSTRACT

Provided are a method and an apparatus for aggregating the WLAN with an E-UTRAN carrier at a radio access network (RAN) level and using the same to transmit and receive LTE-WLAN aggregation data. A method of a terminal for receiving data by aggregating a WLAN carrier may include transmitting WLAN MAC address information or IP address information which are configured in the terminal, receiving configuration information to configure a specific bearer through the WLAN carrier, receiving the data through the base station and the WLAN carrier, respectively, and transferring the specific bearer data received through the WLAN carrier to a PDCP entity of the specific bearer within the terminal.

9 Claims, 6 Drawing Sheets

(51) Int. Cl.
 *H04W 28/08*  (2009.01)
 *H04B 7/26*  (2006.01)
 *H04W 28/02*  (2009.01)
 *H04W 88/06*  (2009.01)
 *H04W 80/02*  (2009.01)

(52) U.S. Cl.
 CPC ............ *H04W 28/08* (2013.01); *H04W 80/02* (2013.01); *H04W 88/06* (2013.01)

(56) References Cited

U.S. PATENT DOCUMENTS

| | | |
|---|---|---|
| 8,995,370 B2 | 3/2015 | Pelletier et al. |
| 9,036,473 B2 | 5/2015 | Himayat et al. |
| 9,264,928 B2 | 2/2016 | Liu et al. |
| 9,288,734 B2 | 3/2016 | Jha et al. |
| 9,414,223 B2 | 8/2016 | Ginzboorg et al. |
| 9,426,689 B2 | 8/2016 | Himayat et al. |
| 9,510,133 B2 | 11/2016 | Gupta et al. |
| 9,510,387 B2 | 11/2016 | Vesterinen et al. |
| 9,585,048 B2 | 2/2017 | Ozturk et al. |
| 9,713,019 B2 | 7/2017 | Negus et al. |
| 9,722,731 B2 | 8/2017 | Ozturk et al. |
| 9,730,081 B2 | 8/2017 | Chang et al. |
| 9,763,199 B2 | 9/2017 | Pelletier et al. |
| 9,860,835 B2 | 1/2018 | Cho et al. |
| 9,918,251 B2 | 3/2018 | Ozturk et al. |
| 9,924,420 B2 | 3/2018 | Peisa et al. |
| 9,924,530 B2 | 3/2018 | Yang et al. |
| 9,973,322 B2 | 5/2018 | Wang et al. |
| 10,219,310 B2 | 2/2019 | Kanugovi et al. |
| 2005/0181776 A1 | 8/2005 | Verma et al. |
| 2006/0079259 A1 | 4/2006 | Gallagher et al. |
| 2006/0104234 A1 | 5/2006 | Zhang |
| 2008/0192925 A1 | 8/2008 | Sachs et al. |
| 2008/0205345 A1 | 8/2008 | Sachs et al. |
| 2009/0061877 A1 | 3/2009 | Gallagher et al. |
| 2009/0318124 A1 | 12/2009 | Haughn |
| 2010/0182910 A1 | 7/2010 | Norefors et al. |
| 2011/0058531 A1 | 3/2011 | Jain et al. |
| 2012/0307744 A1 | 12/2012 | Charbit et al. |
| 2012/0307869 A1 | 12/2012 | Charbit et al. |
| 2013/0028069 A1 | 1/2013 | Pelletier et al. |
| 2013/0064103 A1 | 3/2013 | Koskela et al. |
| 2013/0065585 A1 | 3/2013 | Pelletier et al. |
| 2013/0083653 A1 | 4/2013 | Jain et al. |
| 2013/0083661 A1 | 4/2013 | Gupta et al. |
| 2013/0083726 A1 | 4/2013 | Jain et al. |
| 2013/0083783 A1 | 4/2013 | Gupta et al. |
| 2013/0084885 A1 | 4/2013 | Jain et al. |
| 2013/0084894 A1 | 4/2013 | Jain et al. |
| 2013/0086653 A1 | 4/2013 | Gupta |
| 2013/0088983 A1 | 4/2013 | Pragada et al. |
| 2013/0114446 A1 | 5/2013 | Liu et al. |
| 2013/0216043 A1 | 8/2013 | Ginzboorg et al. |
| 2013/0242783 A1 | 9/2013 | Horn et al. |
| 2013/0242897 A1* | 9/2013 | Meylan ................ H04W 28/16 370/329 |
| 2013/0242965 A1 | 9/2013 | Horn et al. |
| 2013/0265972 A1 | 10/2013 | Shirani-Mehr et al. |
| 2013/0268986 A1 | 10/2013 | Venkatachalam et al. |
| 2013/0287139 A1 | 10/2013 | Zhu et al. |
| 2013/0288686 A1 | 10/2013 | Chou |
| 2013/0294390 A1 | 11/2013 | Yang et al. |
| 2013/0294423 A1 | 11/2013 | Wang et al. |
| 2014/0003270 A1 | 1/2014 | Maltsev et al. |
| 2014/0010207 A1 | 1/2014 | Horn et al. |
| 2014/0018037 A1 | 1/2014 | Shanmugavadivel et al. |
| 2014/0036669 A1 | 2/2014 | Yang et al. |
| 2014/0050086 A1 | 2/2014 | Himayat et al. |
| 2014/0071925 A1 | 3/2014 | Liu |
| 2014/0079007 A1 | 3/2014 | Li et al. |
| 2014/0079022 A1 | 3/2014 | Wang et al. |
| 2014/0101726 A1 | 4/2014 | Gupta et al. |
| 2014/0112406 A1 | 4/2014 | Zhu et al. |
| 2014/0153489 A1 | 6/2014 | Perras et al. |
| 2014/0161004 A1 | 6/2014 | Wang et al. |
| 2014/0177427 A1 | 6/2014 | Yiu et al. |
| 2014/0185523 A1 | 7/2014 | Davydov et al. |
| 2014/0219185 A1 | 8/2014 | Etemad et al. |
| 2014/0307622 A1 | 10/2014 | Horn et al. |
| 2014/0348115 A1 | 11/2014 | Wang et al. |
| 2014/0355529 A1 | 12/2014 | Zhu et al. |
| 2014/0362704 A1 | 12/2014 | Jha et al. |
| 2014/0369201 A1* | 12/2014 | Gupta ................ H04W 4/70 370/235 |
| 2015/0016414 A1 | 1/2015 | Hwang et al. |
| 2015/0029845 A1 | 1/2015 | Jain et al. |
| 2015/0036495 A1 | 2/2015 | Venkatachalam et al. |
| 2015/0063295 A1 | 3/2015 | Himayat et al. |
| 2015/0092688 A1* | 4/2015 | Jeong ................ H04W 8/26 370/329 |
| 2015/0117357 A1* | 4/2015 | Ozturk ............ H04W 28/0205 370/329 |
| 2015/0139079 A1 | 5/2015 | Zhu et al. |
| 2015/0208274 A1 | 7/2015 | Himayat et al. |
| 2015/0208286 A1* | 7/2015 | Ozturk ............ H04W 36/0022 370/331 |
| 2015/0215777 A1 | 7/2015 | Sirotkin et al. |
| 2015/0223243 A1 | 8/2015 | Tabet et al. |
| 2015/0230225 A1* | 8/2015 | Uchino ............ H04W 72/0406 455/450 |
| 2015/0249946 A1 | 9/2015 | Oh |
| 2015/0256303 A1 | 9/2015 | Belghoul et al. |
| 2015/0257024 A1 | 9/2015 | Baid et al. |
| 2015/0282013 A1 | 10/2015 | Kim et al. |
| 2015/0312810 A1 | 10/2015 | Yasuda et al. |
| 2015/0327236 A1* | 11/2015 | Lin ................ H04W 72/0406 370/329 |
| 2015/0334599 A1 | 11/2015 | Maaref et al. |
| 2015/0350988 A1 | 12/2015 | Himayat et al. |
| 2015/0351079 A1* | 12/2015 | Himayat ............ H04W 28/08 370/329 |
| 2015/0358884 A1 | 12/2015 | Nagasaka et al. |
| 2015/0373607 A1 | 12/2015 | Zhu |
| 2016/0021581 A1 | 1/2016 | Deenoo et al. |
| 2016/0057660 A1 | 2/2016 | Hong et al. |
| 2016/0066234 A1 | 3/2016 | Cho et al. |
| 2016/0073265 A1 | 3/2016 | Vutukuri et al. |
| 2016/0112896 A1 | 4/2016 | Karampatsis et al. |
| 2016/0165508 A1 | 6/2016 | Jin |
| 2016/0192252 A1 | 6/2016 | Dai et al. |
| 2016/0227504 A1 | 8/2016 | Etemad et al. |
| 2016/0285716 A1 | 9/2016 | Pelletier et al. |
| 2016/0302135 A1 | 10/2016 | Yang et al. |
| 2016/0323027 A1 | 11/2016 | Zhu et al. |
| 2016/0323790 A1 | 11/2016 | Wang et al. |
| 2016/0323798 A1 | 11/2016 | Horn et al. |
| 2016/0330669 A1 | 11/2016 | Li et al. |
| 2016/0337781 A1 | 11/2016 | Jain et al. |
| 2017/0013565 A1 | 1/2017 | Pelletier et al. |
| 2017/0048914 A1 | 2/2017 | Zeng et al. |
| 2017/0055313 A1 | 2/2017 | Sharma et al. |
| 2017/0070923 A1 | 3/2017 | Li et al. |
| 2017/0078914 A1 | 3/2017 | Fujishiro et al. |
| 2017/0094701 A1 | 3/2017 | Hong et al. |
| 2017/0134123 A1 | 5/2017 | Ozturk et al. |
| 2017/0142691 A1 | 5/2017 | Sirotkin |
| 2017/0201920 A1 | 7/2017 | Shi et al. |
| 2017/0222746 A1 | 8/2017 | Kang et al. |
| 2017/0257265 A1 | 9/2017 | Hong et al. |
| 2017/0264606 A1 | 9/2017 | Forssell et al. |
| 2017/0290021 A1 | 10/2017 | Choi et al. |
| 2017/0311362 A1 | 10/2017 | Hong et al. |
| 2017/0318580 A1 | 11/2017 | Park et al. |
| 2018/0020500 A1 | 1/2018 | Pelletier et al. |
| 2018/0092146 A1 | 3/2018 | Hong et al. |

(56) References Cited

U.S. PATENT DOCUMENTS

2018/0098265 A1 4/2018 Tomici et al.
2018/0132135 A1* 5/2018 Shi .................. H04L 5/0053

FOREIGN PATENT DOCUMENTS

| JP | 2014-096664 | A  | 5/2014  |
|----|-------------|----|---------|
| WO | 2012/148482 | A1 | 11/2012 |
| WO | 2014/157888 | A1 | 10/2014 |
| WO | 2014/168426 | A1 | 10/2014 |

OTHER PUBLICATIONS

Sony, "Ue capabilities for WLAN Interworking", R2-143162, 3GPP TSG-RAN WG2 Meeting #87, Dresden, Germany, Aug. 18-22, 2014, pp. 1-3.

Samsung, "AS/NAS modelling for WLAN/3GPP radio interworking", R2-142214, 3GPP TSG-RAN2 Meeting #86, Seoul, Korea, May 19-23, 2014, pp. 1-3.

Intel Corporation, "New SI Proposal: LTE-WLAN Radio Level Integration", RP-141276, 3GPP TSG RAN Meeting #65, Edinburgh, Scotland, Sep. 9-12, 2014, pp. 1-6.

3GPP, "3rd Generation Partnership Project; Technical Specification Group Services and System Aspects; 3GPP system to Wireless Local Area Network (WLAN) interworking; System description (Release 12)", 3GPP TS 23.234 V12.0.0, Sep. 22, 2014.

3GPP, "LTE; Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014.

* cited by examiner

METHOD AND APPARATUS FOR CARRIER AGGREGATION USING AGGREGATION ENTITY

CROSS REFERENCE TO RELATED APPLICATIONS

This application is a National Stage Patent Application of PCT International Patent Application No. PCT/KR2015/009333 (filed on Sep. 4, 2015) under 35 U.S.C. § 371, which claims priority to Korean Patent Application Nos. 10-2014-0119263 (filed on Sep. 5, 2014) and 10-2015-0094021 (filed on Jul. 1, 2015), the teachings of which are incorporated herein in their entireties by reference.

TECHNICAL FIELD

The present disclosure relates to transmitting and receiving data between a terminal and a base station using a wireless local area network (WLAN) carrier. Particularly, the present disclosure relates to a method and an apparatus for transmitting and receiving long term evolution (LTE)-WLAN aggregation data, in order for aggregating the WLAN using an evolved-universal mobile telecommunication service terrestrial radio access network (E-UTRAN) carrier at a Radio Access Network (RAN) level.

BACKGROUND ART

Due to advance in communication systems, various types of wireless terminals have been introduced to consumers, such as companies and individuals. Lately, a mobile communication system has been affiliated with $3^{rd}$ generation partnership project (3GPP), for example, Long Term Evolution (LTE), LTE-Advanced (LTE-A), and the like. Such a mobile communication system is capable of transmitting and receiving a large amount of data at a high speed. Further, the mobile communication system is capable of transmitting and receiving various types of data, such as image data, and audio data, as well as a typical voice data. Accordingly, there has been demand for developing a technology for transmitting a large amount of data at a high speed as fast as a wired communication network. As a solution, a method for effectively transmitting data through a plurality of cells has been introduced.

However, a base station has a limitation to transmit a large amount of data to a plurality of terminals using limited frequency resources allocated to the base station. Accordingly, a communication service provider has spent excessive cost to secure and exclusively use frequency resources to provide a service to a plurality of terminals.

On the other hand, unlicensed frequency bands cannot be exclusively used by the specific service provider or a specific communication system. Such unlicensed frequency bands may be shared by multiple service providers or communication systems. For example, a wireless local area network (WLAN) technology, which is represented by Wi-Fi, provides data transmission and reception services using frequency resources of unlicensed bands.

Therefore, there is demand for developing a technology for enabling a mobile communication system to transmit data to and receive data from a terminal using a corresponding Wi-Fi Access Point (AP).

DETAILED DESCRIPTION

Technical Problem

The present disclosure is made to solve such a problem, and proposes a detailed method and apparatus for enabling an E-UTRAN to add a WLAN to the terminal at a RAN level as a single carrier in transmitting specific user plane data by the terminal.

In addition, the present disclosure proposes a method and apparatus for transmitting user plane data using an E-UTRAN carrier and a WLAN carrier at the same time.

Technical Solution

In order to solve the above described problems, the present disclosure provides a method for receiving, by a UE, data by aggregating a WLAN carrier. The method may include: transmitting WLAN MAC address information or IP address information, which is configured in a UE; receiving configuration information for configuring a specific bearer through a WLAN carrier; receiving data through a base station and the WLAN carrier, respectively; and transferring data of a specific bearer, received through the WLAN carrier, to a PDCP entity of a specific bearer within the UE.

In addition, the present disclosure provides a method for transmitting data using a WLAN carrier by a base station. The method may include: generating configuration information for configuring a specific bearer through a WLAN carrier; transmitting the configuration information to a UE; and transferring, to a WLAN termination, data to be transmitted through the WLAN carrier.

In addition, the present disclosure provides a UE for receiving data by aggregating a WLAN carrier. The UE may include: a transmitter configured to transmit WLAN MAC address information or IP address information, which is configured in a UE; a receiver configured to receive configuration information for configuring a specific bearer through a WLAN carrier and to receive data through a base station and the WLAN carrier, respectively; and a controller configured to transfer data of a specific bearer, received through the WLAN carrier, to a PDCP entity of a specific bearer within the UE.

In addition, the present disclosure provides a base station for transmitting data using a WLAN carrier. The base station may include: a controller configured to generate configuration information for configuring a specific bearer through a WLAN carrier; and a transmitter configured to transmit the configuration information to a UE and transfer, to a WLAN termination, data to be transmitted through the WLAN carrier.

Advantageous Effects

In accordance with an embodiment of the present disclosure, a detailed method and apparatus may be provided for enabling an E-UTRAN to add a WLAN to the UE at a RAN level as a single carrier in transmitting specific user plane data by a UE.

In accordance with another embodiment of the present disclosure, a method and apparatus may be provided for transmitting, by a UE, user plane data using an E-UTRAN carrier and a WLAN carrier at the same time.

MODE FOR CARRYING OUT THE INVENTION

Figure 1:
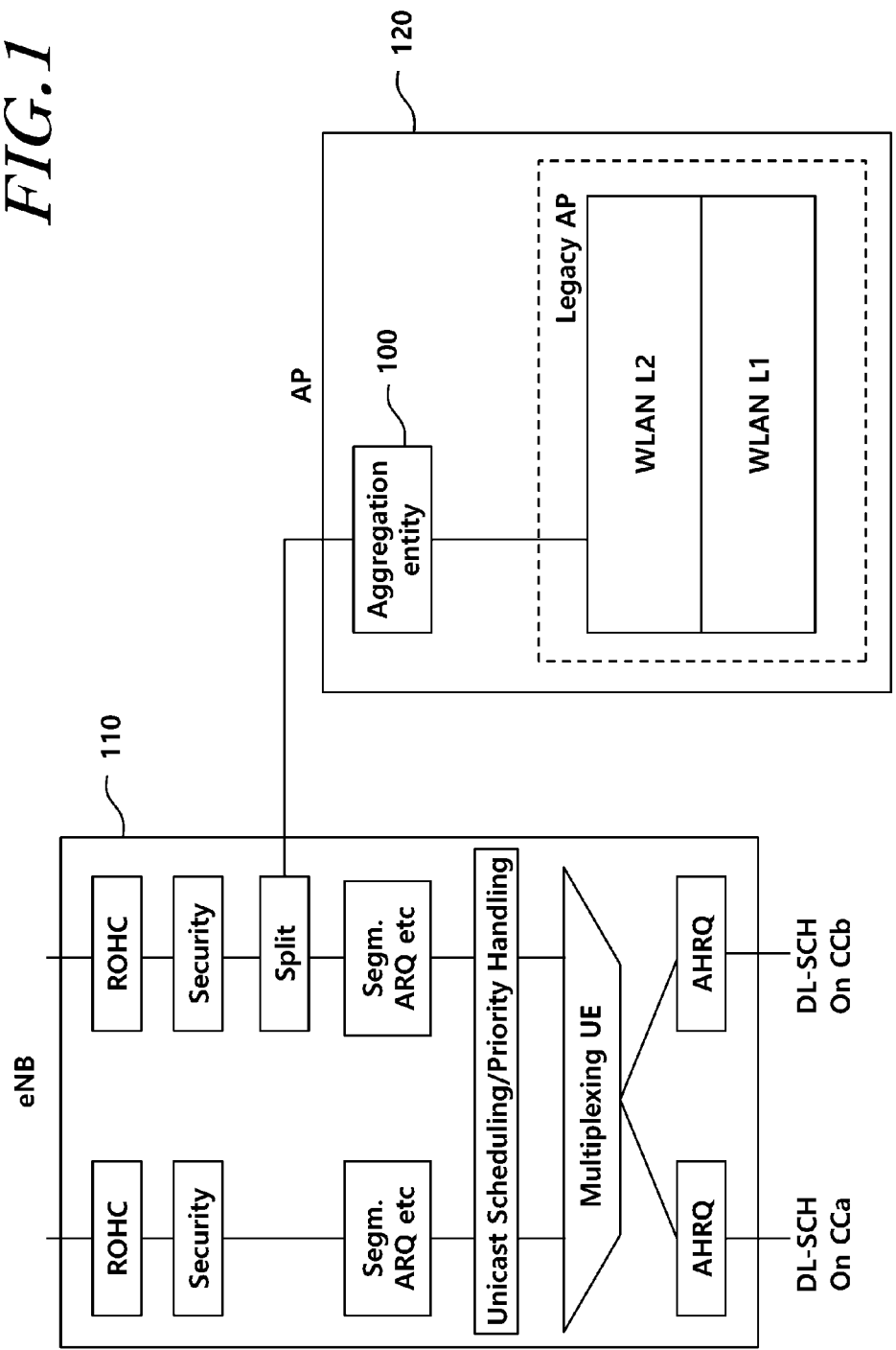
FIG. 1 is a diagram illustrating an example of a Layer 2 configuration diagram for a downlink according to the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

The wireless communication system of the present disclosure may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, the base station or the cell may be construed as an inclusive concept indicating a function or a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, a RRH, a RU, a small cell, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), the base station may be any devices that interact with one another to enable the devices that provide a predetermined wireless area to be controlled by an identical entity or to cooperatively configure the wireless area. Based on a configuration type of a wireless area, the base station may include an eNB, an RRH, an antenna, an RU, a Low Power Node (LPN), a point, a transmission/reception point, a transmission point, a reception point, and the like. In ii), a base station may be a wireless area itself that receives or transmits a signal from a perspective of a user terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications. However, the embodiments of the present disclosure are not limited thereto. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced. The embodiments of the present disclosure may be applicable to resource allocation in a synchronous wireless communication scheme that is advanced to CDMA, CDMA-2000, and UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, an uplink and a downlink may be configured based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/ reception (CoMP) system where two or more transmission/ reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, EPDCCH, a PDSCH, or the like may be described through the expression, "a PUCCH, a PUSCH, a PDCCH, EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH), which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Various technologies for high-speed processing of large amounts of data have been discussed due to rapidly increasing data traffic and the rapidly increasing number of wireless terminals. For example, in 3GPP, an interworking technology using the E-UTRAN and wireless LAN (WLAN) has been discussed. That is, in 3GPP Release 12, a study on 3GPP/WLAN interworking item has been introduced. The 3 GPP/WLAN interworking item provides a Radio Access Network (RAN) assisted WLAN interworking function. The E-UTRAN may assist UE based bidirectional traffic steering between the E-UTRAN and the WLAN for UEs in the RRC_IDLE state and RRC_CONNECTED state.

The E-UTRAN provides assistance parameters to the UE through broadcast or dedicated RRC signaling. For example, the RAN assistance parameters may include at least one of an E-UTRAN signal strength threshold, a WLAN channel utilization threshold, a WLAN backhaul data transmission rate threshold, a WLAN signal strength, and an offload preference indicator. In addition, the E-UTRAN may provide a list of WLAN identifiers to the UE through the broadcast signaling.

The UE uses the RAN assistance parameters in the evaluation of access network selection and traffic steering rules.

When the access network selection and traffic steering rules are fulfilled, the UE indicates the same in the access stratum (AS) upper layer.

When applying the access network selection and traffic steering rules described above, the UE performs traffic steering between the E-UTRAN and the WLAN with APN granularity.

As described above, the RAN assisted WLAN interworking function provides a method in which only the E-UTRAN and WLAN are built in a standalone manner and interwork with each other.

However, to achieve the high-speed processing of large volumes of data, there is an increasing need of the aggregation of the LTE and WLAN that considers a tighter integration at the RAN level compared to the RAN assisted WLAN interworking. As described above, the RAN assisted WLAN interworking may only operate according to the standalone operation of E-UTRAN and WLAN with the APN granularity. Therefore, in transmitting specific user plane data by a UE, the E-UTRAN may not simultaneously use the WLAN carrier with the E-UTRAN carrier by adding the WLAN carrier at the RAN level as a carrier in the E-UTRAN. Hereinafter, a WLAN radio link, a WLAN radio, a WLAN radio resource, or a WLAN radio network are collectively referred to as the WLAN carrier. Accordingly, the WLAN carrier may be understood as the WLAN radio link, WLAN radio, WLAN radio resource, or WLAN radio network according to the necessity or the situation. In addition, in the present specification, a carrier using the E-UTRAN technology is described as an LTE carrier, and a carrier using the WLAN technology is described as the WLAN carrier. This is done for the convenience of understanding, and the LTE carrier may include all carriers using a mobile communication system including LTE. In addition, the WLAN carrier may also be used to include all of the carriers of a wireless communication system.

Meanwhile, as an example for the UE to utilize the LTE carrier and the WLAN carrier at the same time, a method for performing data communication by the UE is provided, wherein the UE may separate (or split or routing)/integrate (or aggregation or merge) user plane data units to be transmitted in an application, a session layer, a transmission layer, or a core network, to use the LTE carrier and WLAN carrier. However, this method has a problem in that the standardized procedure does not exist, or the WLAN carrier may not be quickly added or released by effectively considering the radio environment at the RAN level and the mobility of the UE.

In addition, in transmitting specific user plane data by the UE, the typical E-UTRAN may not simultaneously use the WLAN carrier with the E-UTRAN carrier by adding the WLAN carrier at the RAN level as a carrier in the E-UTRAN. In addition, a method of using the LTE carrier and WLAN carrier by separating/integrating data units on the typical application, session layer, transport layer, or core network may have problems in that the standardized procedure does not exist or the radio environment at the RAN level and the mobility of the UE are not effectively considered, and the like.

The present disclosure is made to solve such a problem, and the objective of the present disclosure is to provide a method and apparatus for enabling an E-UTRAN to add a WLAN to the UE at a RAN level as a single carrier in transmitting specific user plane data by a UE. In accordance with at least one embodiment, the UE may transmit the user plane data using the E-UTRAN carriers and WLAN carriers at the same time.

The present disclosure can be applied in a scenario where a base station and a WLAN termination are co-located. In addition, the present disclosure may be applied in a scenario where the base station and the WLAN termination are non-co-located. In a scenario where the base station and the WLAN termination are non-co-located, the base station and the WLAN termination may be connected or built through a non-ideal backhaul, a near-ideal backhaul, or an ideal backhaul.

The WLAN termination in the present specification refers to a logical WLAN network node. For example, the WLAN termination may be a WLAN AP or a WLAN AC. The WLAN termination may be a WLAN network node, such as a typical WLAN AP or a typical WLAN AC, or may be a WLAN network node including an additional function for integrating WLAN into the typical WLAN AP or the typical WLAN AC and transmitting the same. The WLAN termination may be implemented as an independent entity or as a functional entity included in another entity.

For the E-UTRAN to add the WLAN carrier to the UE at the RAN level as one carrier within the E-UTRAN and use the E-UTRAN carrier and the WLAN carrier at the same time, a control plane procedure for the same should be provided. In addition, for the E-UTRAN to add the WLAN carrier to the UE at the RAN level as one carrier within the E-UTRAN, and to transmit user plane data by using the E-UTRAN carrier and the WLAN carrier at the same time, a protocol structure for the same and an operation of each layer should be provided. In addition, the addition of the WLAN or WLAN carrier as one carrier by the E-UTRAN indicates that the UE and the base station logically or conceptually add an additional function for a WLAN carrier PHY/MAC transmission function to the typical E-UTRAN cell.

To apply the present disclosure, a method of splitting or aggregating data at a RAN level between a base station and a WLAN termination is required. Hereinafter, a detailed embodiment for splitting or aggregating user plane data between the base station and the WLAN termination at the RAN level will be described with reference to the accompanying drawings.

Sublayer Configuration for Splitting or Aggregating User Plane Data

The E-UTRAN may implement a method of splitting or aggregating user plane data by adding a WLAN to a UE in the RAN level, as one carrier in the E-UTRAN, through each sub-layer.

E-UTRAN MAC Layer Split or Aggregation

For example, in transmitting the user plane data by adding the WLAN as one carrier, such as a Carrier Aggregation (CA) technology based on a single base station, the E-UTRAN may split or aggregate the user plane data in the MAC layer. The MAC layer of the E-UTRAN processes operations, such as dynamic scheduling or priority, according to the state of WLAN. Therefore, the split or aggregation in the MAC layer of the E-UTRAN may seriously affect the typical standard of the E-UTRAN. In addition, it may be difficult to directly interwork with the PHY or MAC layer of WLAN, which is another standard specification, or receive information of the PHY or MAC layer of the WLAN.

E-UTRAN RLC Layer Split or Aggregation

As another example, in transmitting user plane data by adding WLAN as one carrier, the E-UTRAN may split or aggregate the user plane data in the radio link control (RLC) layer. The RLC layer segments or concatenates the RLC service data units (SDUs) to fit the same within the total size of the RLC packet data unit (PDU) indicated by the lower layer at the time of a particular transmission opportunity notified by a lower layer. The RLC layer performs error correction through ARQ for the Acknowledged Mode (AM) data transmission. Since the WLAN MAC layer may also transmit or retransmit data through the WLAN carrier, it may not be required for the RLC layer to perform segmentation or concatenation through interworking with the WLAN MAC layer, which is another standard specification. However, the RLC layer may provide a HARQ reordering function. Accordingly, when the E-UTRAN desires to use the WLAN as one carrier at the RLC layer, data can be sequentially transmitted by receiving data received through a WLAN radio link that is different from the E-UTRAN and reordering the same. To this end, when AM Data PDUs (AMD PDUs) are formed from the RLC SDUs, the transmitting side of an AM RLC entity may not segment or concatenate the RLC SDUs at the request from the WLAN termination or which will be separated and transferred to the WLAN termination.

The transmitting side of the AM RLC entity may perform retransmission of RLC data PDUs. In addition, when retransmitting the RLC data PDUs, the transmitting side of an AM RLC entity may not segment or concatenate the RLC PDUs at the request from the WLAN termination or which will be separated and transferred to the WLAN termination.

When forming AMD PDUs from the RLC SDUs or retransmitting the RLC data PDUs (segments), the transmitting side of the AM RLC entity may include the associated RLC header in the RLC data PDU.

E-UTRAN PDCP Layer Split/Aggregation

As another example, in transmitting user plane data by adding a WLAN carrier as one carrier, the E-UTRAN may split or aggregate the user plane data in the packet data convergence protocol (PDCP) layer.

FIG. 1 is a diagram illustrating an example of a Layer 2 configuration diagram for a downlink according to the present disclosure.

Referring to FIG. 1, in accordance with at least one embodiment, the E-UTRAN may split or aggregate user plane data in the PDCP layer. To this end, a base station may be connected to an aggregation entity 100 that may be configured within a WLAN termination 120. That is, a PDCP entity 110 of the base station may interwork with the aggregation entity 100 of the WLAN termination 120.

Figure 2:
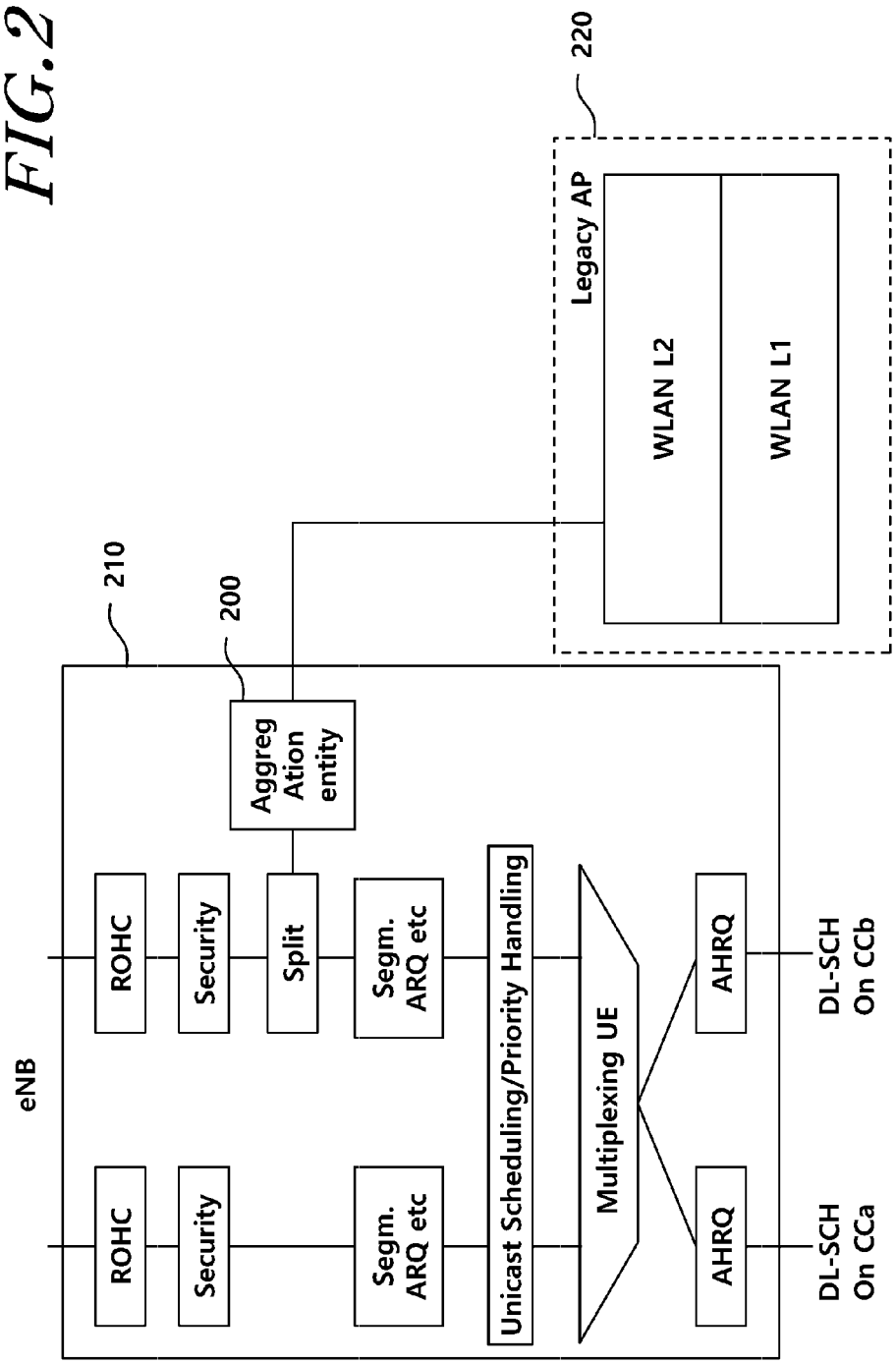
FIG. 2 is a diagram illustrating another example of a Layer 2 configuration diagram for a downlink according to the present disclosure.

FIG. 2 is a diagram illustrating another example of a Layer 2 configuration diagram for a downlink according to the present disclosure.

Referring to FIG. 2, in accordance with at least one embodiment, the E-UTRAN may split or aggregate user plane data in the PDCP layer. To this end, a PDCP entity 210 of a base station may include an aggregation entity 200. The base station may establish a connection with the WLAN termination 220 using the aggregation entity 200.

Although FIG. 1 and FIG. 2 illustrate diagrams where PDCP PDUs to which a PDCP header is added are split or aggregated in the PDCP layer, a method for splitting or aggregating PDCP SDUs or PDCP SDUs associated with a sequence number in the PDCP layer are also included in the scope of embodiments of the present disclosure.

Hereinafter, in transmitting user plane data, by the E-UTRAN, by adding the WLAN carrier as one carrier, the procedure and detailed method of splitting or aggregating the user plane data in the PDCP layer will be described in detail.

PDCP Layer Split or Aggregation Procedure

Although procedures and detailed methods for splitting or aggregating user plane data in the PDCP layer/entity will be described for the sake of understanding, the procedures and detailed methods included in the following description may also be applied to the method of splitting or aggregating user plane data in the RLC layer/entity. That is, the PDCP layer/entity/SDUs/PDUs included in each description may be changed to RLC layer/entity/SDUs/PDUs and applied to the splitting or aggregation method of the same.

The E-UTRAN may add the WLAN carrier as one carrier in the PDCP layer. The E-UTRAN may transmit user data traffic using the LTE carrier and the WLAN carrier at the same time. In this case, the WLAN carrier may be used as a dedicated downlink carrier. That is, the uplink transmission for a specific bearer that uses the LTE carrier and the WLAN carrier at the same time may be performed only through the carrier(s) between the terminal and the base station. In this case, the layer 2 configuration for uplink transmission of the UE may be the same as the typical configuration.

Alternatively, in a method of adding the WLAN carrier as one carrier in the PDCP layer and transmitting the user data traffic using the LTE carrier and the WLAN carrier at the same time, the E-UTRAN may use the WLAN carrier for both the uplink and the downlink. That is, both the uplink transmission and the downlink transmission may be used for a specific bearer that uses the LTE carrier and the WLAN carrier at the same time.

Aggregation Entity for Aggregation or Interworking Between Base Station and WLAN Termination For the E-UTRAN to add the WLAN carrier as one carrier in the PDCP layer and to transmit downlink user data traffic using the LTE carrier and the WLAN carrier at the same time, it may require an aggregation entity for the aggregation or interworking between the base station and the WLAN termination. The aggregation entity in the present specification is a term described for the convenience of understanding, but is not limited thereto. Accordingly, the aggregation entity may be variously referred to as an interworking entity, an interworking function, a logical entity for LTE-WLAN aggregation, or an LTE-WLAN aggregation entity, etc., and described hereinafter as the aggregation entity.

The aggregation entity may be an independent entity or a functional entity of another network entity. For example, when the base station and the WLAN termination are co-located and the same is provided as an integrated device, the aggregation entity may be a functional entity included in the integrated device. As another example, when the base station and the WLAN termination are non-co-located, an aggregation entity may be a functional entity included within the WLAN termination. In another example, when the base station and the WLAN termination are non-co-located, an aggregation entity may be a functional entity included within the base station.

The aggregation entity may be implemented as a higher layer entity than L1/L2. For example, when the aggregation entity is configured to include a functional entity included in the WLAN termination, the aggregation entity may operate as a higher layer entity than the WLAN L1/L2 and transmit the user plane data to the UE through the WLAN L1/L2. As another example, when the aggregation entity is configured to include a functional entity included in the base station, the aggregation entity may operate as an upper layer entity (for example, an IP layer, a session layer, or an application layer) and transmit the user plane data to the UE through the WLAN termination. As another example, when the aggregation entity is configured to include a functional entity included in the base station, the aggregation entity may i) operate as a protocol conversion function entity that receives the PDCP PDUs and transmits the PDCP PDUs through the WLAN termination and ii) transmit the user plane data to the UE through the WLAN termination.

Alternatively, the aggregation entity may be configured to include a function within the WLAN L2 so that the WLAN L2 entity may implement an operation for the same.

Alternatively, the aggregation entity may be configured to include a PDCP lower layer within the UE, classify data of a particular radio bearer, which is received through the WLAN carrier, and transmit the same to the linked PDCP entity.

Meanwhile, the aggregation entity according to each embodiment described above may receive PDCP PDUs from the PDCP entity of the base station. Alternatively, the aggregation entity may transmit a request for the PDCP PDUs to the PDCP entity of the base station to receive the PDCP PDUs.

The aggregation entity may transmit the received PDCP PDUs to the UE through the WLAN radio link. Alternatively, the aggregation entity may transmit the received PDCP PDUs to the UE using the WLAN L1/L2 protocol. Alternatively, the aggregation entity may transmit, to the UE, the received PDCP PDUs through the WLAN termination (or WLAN wireless link), using the IP communication (or IP packet forwarding). Alternatively, the aggregation entity may transmit the received PDCP PDUs to the UE using the WLAN communication (or WLAN MAC forwarding) through the WLAN termination (or WLAN wireless link).

In accordance with at least one embodiment, the UE may transmit the PDCP PDUs, which is received through the WLAN radio link, to the corresponding PDCP entity within the UE. Alternatively, the UE may transmit the received PDCP PDUs to the corresponding PDCP entity within the UE, using the WLAN L1/L2 protocol within the UE.

Meanwhile, in accordance with at least one embodiment, the base station may split data traffic belonging to a specific bearer in the PDCP layer and transmit the same through the base station and the WLAN termination. That is, in order to transmit the user plane data through the E-UTRAN carrier and the WLAN carrier in units of radio bearers, the PDCP entity of the base station may split the PDCP PDUs into the linked RLC entity or the linked aggregation entity and submit the same.

For the PDCP entity to transmit the user plane data through the E-UTRAN carrier and/or the WLAN carrier in units of radio bearers, the base station may configure such that the PDCP PDUs, which is received by the UE through the WLAN radio link for the corresponding specific bearer, is transferred to the PDCP entity of the corresponding specific bearer within the UE. Alternatively, for the PDCP entity to transmit the user plane data through the E-UTRAN carrier and/or the WLAN carrier in units of radio bearers, the base station may include information for transmission of the PDCP PDUs, which is received by the UE through the WLAN radio link for the corresponding specific bearer, to the PDCP entity of the corresponding specific bearer within the UE, and transmit the same.

On the other hand, when the base station and the WLAN termination are non-co-located, the user plane data (PDCP PDUs) on the interface between the base station and the WLAN termination may be delivered through the GTP-U protocol. When the base station (eNB) and the WLAN termination are non-co-located, if an interface between the eNB and the WLAN termination is linked to the E-RAB for the bearer provided through the eNB and the WLAN termination, then the GTP-U may deliver the PDCP PDUs.

When the E-UTRAN adds a WLAN carrier as one carrier and configures an aggregation entity for transmitting downlink user data traffic using the LTE carrier and the WLAN carrier at the same time, the user data bearer is set up on the interface between the base station and the WLAN termination, and a user plane protocol instance is set at the base station and WLAN termination, respectively.

Each of the user plane protocol instances on the interface between the base station and the WLAN termination is linked to one E-RAB. Therefore, each E-RAB may identify a user plane data bearer on the interface between the base station and the WLAN termination, an endpoint of a user plane data bearer of the base station linked to the corresponding bearer, or an endpoint of a WLAN termination linked to the corresponding bearer, using the GTP Tunnel endpoint Information Element (IE).

The aggregation entity configured within the WLAN termination may include a user plane instance within the WLAN termination. Alternatively, the aggregation entity may be operated in conjunction with a user plane instance within the WLAN termination. Alternatively, the aggregation entity may be operated as the user plane instance within the WLAN termination.

Alternatively, when the base station and the WLAN termination are non-co-located, the user plane data (PDCP PDUs) on the interface between the base station and the WLAN termination may be transmitted by being included in the payload of the IP protocol. The base station may include the PDCP PDUs, which will be transmitted to the UE through the WLAN termination, in the data field of an IP packet. The base station may transmit the PDCP PDUs to the UE through the WLAN termination, in which the IP address of the UE is set as the destination address.

Alternatively, when the base station and the WLAN termination are non-co-located, the user plane data (PDCP PDUs, PDCP SDUs, or PDCP SDUs associated with sequence number) on the interface between the base station and the WLAN termination may be transmitted by being included in the payload of the WLAN L2 (or WLAN MAC) protocol. The base station may include PDCP PDUs (or PDCP SDUs or PDCP SDUs associated with sequence number), which will be transmitted through the WLAN termination to the UE, in the data field of the WLAN L2 (or WLAN MAC) frame. The base station may transmit the PDCP PDUs through the WLAN termination to the UE, in which the WLAN MAC address of the UE is set as the destination address.

Meanwhile, in accordance with at least one embodiment, data received by the UE through the WLAN termination may refer to PDCP SDUs, PDCP SDUs associated with sequence number, PDCP PDUs, user plane data, or user plane packets, and the data may be described, if required, as data, user plane data, user plane packets, PDCP SDUs, PDCP SDUs associated with sequence numbers, PDCP PDUs, and the like, respectively.

Hereinafter, a data transmission method will be described with reference to the accompanying drawings.

Figure 3:
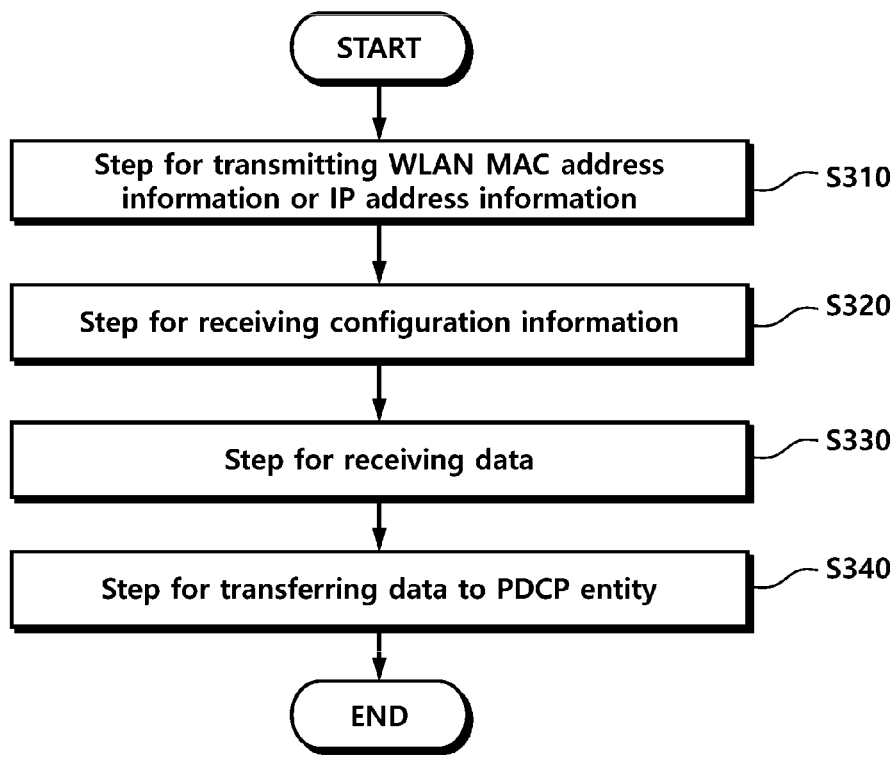
FIG. 3 is a diagram illustrating operations of a UE according to an embodiment of the present disclosure.

FIG. 3 is a diagram illustrating an operation of a UE according to an embodiment of the present disclosure.

According to an embodiment of the present disclosure, a method for receiving data by aggregating a WLAN carrier by a UE may include: transmitting WLAN MAC address information or IP address information, which is configured in a UE; receiving configuration information for configuring a specific bearer through a WLAN carrier; receiving data through a base station and the WLAN carrier, respectively; and transferring data of a specific bearer, received through the WLAN carrier, to a PDCP entity of a specific bearer within the UE.

Referring to FIG. 3, the UE may perform an operation of transmitting WLAN MAC address information or IP address information, which is configured in the UE (S310). For example, the UE may transmit at least one of WLAN MAC address information and IP address information, which is configured in the UE to the base station or the WLAN termination. This is because the WLAN MAC address or IP address information of the UE is required when the PDCP PDUs are transmitted through the LTE carrier and the WLAN carrier in order for the WLAN termination or the aggregation entity to transmit PDCP PDUs or PDCP SDUs to the corresponding UE. That is, the WLAN termination or aggregation entity may require the WLAN MAC address and/or IP address of the UE in order to transmit the received PDCP PDUs (or PDCP SDUs) to the UE through the WLAN radio link. To this end, the UE may transmit the WLAN MAC address and/or IP address information to the base station or the WLAN termination in which the aggregation entity is configured. If the base station receives the WLAN MAC address information or IP address information of the UE and the aggregation entity is configured in the WLAN termination, the base station may transmit the WLAN MAC address information or the IP address information of the UE to the aggregation entity.

The UE may perform an operation of receiving configuration information for configuring a specific bearer through the WLAN carrier (S320). For example, the base station may transmit, to the UE, the configuration information that is required to add a WLAN carrier to the UE and transmit data. The UE may receive the configuration information from the base station and acquire information on a specific bearer configured through the LTE carrier and the WLAN carrier. In addition, the UE may be configured to receive the user plane data belonging to the corresponding specific bearer through the WLAN carrier using the configuration information and transmit the user plane data to the linked PDCP entity. Accordingly, the UE may receive data of a specific bearer through the WLAN carrier.

In addition, the UE may perform an operation of receiving data through each of the base station and the WLAN carrier (S330). As described above, the UE may receive data through the base station and the WLAN termination. For example, the UE may be configured to receive a specific bearer, separately configured through the aggregation entity, through the WLAN carrier, and receive data of the specific bearer. In addition, the UE may receive data through the base station.

In addition, the UE may perform an operation of transferring the data of the specific bearer, received through the WLAN carrier, to the PDCP entity of the specific bearer within the UE (S340). The UE may transmit data of the specific bearer, received through the WLAN carrier, to the corresponding PDCP entity within the UE. For example, the UE may be configured to receive the specific bearer through the WLAN carrier based on the configuration information, and when data is received through the corresponding WLAN carrier, the data may be transmitted to the PDCP entity within the UE. In this case, the specific bearer transmitted to the PDCP entity of the specific bearer may be determined based on the configuration information.

Hereinafter, the detailed operation of the UE will be described in more detail.

User Plane Data Transmission Through WLAN Carrier

The aggregation entity may transmit the received PDCP PDUs (or user plane data, data, PDCP SDUs, or PDCP SDUs associated with sequence number) to the UE through the WLAN radio link. Alternatively, the aggregation entity may transmit the received PDCP PDUs (or user plane data, data, PDCP SDUs, or PDCP SDUs associated with sequence number) to the UE using the WLAN L1/L2 protocol. To this end, the aggregation entity may require the WLAN MAC address and/or an IP address of the UE to transmit the received PDCP PDUs (or user plane data, data, PDCP SDUs, or PDCP SDUs associated with sequence number) to the UE through the WLAN radio link.

The UE may transmit the MAC address information to the base station or the WLAN termination.

For example, the aggregation entity may obtain the WLAN MAC address information of the UE to transmit PDCP PDUs (or user plane data, data, PDCP SDUs, or PDCP SDUs associated with sequence number) to the UE. To this end, the UE may transmit the WLAN MAC address information of the UE to the base station. When the aggregation entity is a functional entity included within the WLAN termination in a scenario where the base station and the WLAN termination are non-co-located, the base station may transmit the WLAN MAC address information of the UE to the WLAN termination if the base station configures the LTE-WLAN aggregation. Alternatively, when the base station adds the WLAN as one carrier, or when the base station makes a request for adding a WLAN to the WLAN termination, the base station may transmit the WLAN MAC address information of the UE.

In another example, when the base station and the WLAN termination are co-located and the same is provided as an integrated device, or when the aggregation entity is a functional entity included in the base station in a scenario where the base station and the WLAN termination are non-co-located, the UE may transmit the WLAN MAC address information of the UE to the base station. Accordingly, the aggregation entity may obtain the WLAN MAC address information of the UE, to transmit, to the UE, PDCP PDUs (or user plane data, data, PDCP SDUs, or PDCP SDUs associated with sequence number) through the WLAN termination.

As another example, the UE may transmit the WLAN MAC address information of the UE to the WLAN termination according to the setting of the base station. For example, the aggregation entity, in a scenario where the base station and the WLAN termination are non-co-located, may be a functional entity included within the WLAN termination. In this case, in order to configure the LTE-WLAN aggregation, the base station may transmit configuration information required for configuring the LTE-WLAN aggregation to the UE through an RRC Connection Reconfiguration message. The UE that has received the RRC connection reconfiguration message may attempt to access the WLAN termination and notify of the WLAN MAC address information of the UE to the aggregation entity.

In the methods, the UE may transmit the WLAN MAC address information to the base station through the RRC message. For example, the UE may transmit WLAN MAC address information through a UE assistance message. As another example, the UE may transmit WLAN MAC address information through a measurement report. As another example, the UE may transmit the WLAN MAC address information through a UL information transfer message. As another example, the UE may transmit the WLAN MAC address information through the UE information procedure. To this end, when the base station makes a request for the WLAN MAC address information through the UE Information request message, the UE may transmit the WLAN MAC address information through a UE information response message.

Alternatively, the UE may transmit the IP address information to the base station or the WLAN termination.

For example, the aggregation entity may obtain the IP address information of the UE, to transmit the PDCP PDUs to the UE. The IP address of the UE may be an IP address for connecting a PDN assigned by a UE-requested PDN connectivity procedure in an attach procedure or a UE-requested PDN connectivity procedure. Alternatively, the IP address of the UE may be an IP address assigned through the WLAN termination.

To this end, the UE may transmit the IP address information of the UE to the base station. The aggregation entity, in a scenario where the base station and the WLAN termination are non-co-located, may be a functional entity included within the WLAN termination. Accordingly, when the base station attempts to add the WLAN carrier as one carrier, or when the base station makes a request for adding the WLAN to the WLAN termination, the base station may transmit the information to the WLAN termination.

In another example, when the base station and the WLAN termination are co-located and the same is provided as an integrated device, or when the aggregation entity is a functional entity included in the base station in a scenario where the base station and the WLAN termination are non-co-located, the UE may transmit the IP address information of the UE to the base station or the integrated device, which is established by co-locating the base station and the WLAN termination. Accordingly, the aggregation entity may obtain the IP address information of the UE, to transmit the PDCP PDUs to the UE through the WLAN termination.

In another example, when the base station and the WLAN termination are non-co-located, the aggregation entity may be a functional entity included within the WLAN termination. In this case, the base station may receive the IP address information of the UE through the MME. The base station may transmit the IP address information of the UE to the WLAN termination when the base station attempts to add the WLAN as one carrier.

In another example, when the base station and the WLAN termination are co-located and the same is configured as an integrated device, or when the aggregation entity is a functional entity included in the base station in a scenario where the base station and the WLAN termination are non-co-located, the MME may transmit the IP address information of the UE to the base station or the integrated device. The aggregation entity may obtain the IP address information of the UE, to transmit the PDCP PDUs to the UE.

In another example, when the base station and the WLAN termination are non-co-located, the aggregation entity may be a functional entity included in the WLAN termination. Accordingly, when the base station attempts to add a WLAN as one carrier, the base station may transmit, to the UE, an RRC connection reconfiguration message including configuration information for LTE-WLAN aggregation. The UE that has received the RRC connection reconfiguration message may attempt to access the WLAN termination and transmit the IP address of the UE to the aggregation entity.

In the methods of transmitting the IP address information, the UE may transmit the IP address information to the base station through the RRC message. For example, the UE may transmit the IP address information through a UE assistance message. As another example, the UE may transmit the IP address information through a measurement report. As another example, the UE may transmit the IP address information through a UL information transfer message. As another example, the UE may transmit the IP address information through a UE information procedure. To this end, when the base station makes a request for the IP address information through a UE Information request message, the UE may transmit the IP address information through a UE information response message.

Alternatively, the WLAN termination or aggregation entity may obtain the WLAN MAC address information of the UE using an Address Resolution Protocol (ARP).

The aggregation entity may transmit PDCP PDUs through a WLAN radio link using WLAN MAC address information and/or IP address information of the UE.

Transfer PDCP PDUs, Received Through a WLAN Radio Link, to a PDCP Entity in the Corresponding UE Hereinafter, the PDCP PDUs, received by the UE, through the WLAN radio link will be described as an example. However, the PDCP PDUs is merely an example, and the description may also be applied to the case of user plane data, data, PDCP SDUs, or PDCP SDUs associated with sequence number. That is, in the following, the embodiment of the present disclosure may also include a case where user plane data, data, PDCP SDUs, or PDCP SDUs associated with the sequence number are used instead of the PDCP PDUs.

The UE may transmit the PDCP PDUs, received through the WLAN radio link, to the corresponding PDCP entity within the UE. Alternatively, the UE may transmit the received PDCP PDUs to the corresponding PDCP entity within the UE using the WLAN L1/L2 protocol within the UE.

First, a detailed method of transmitting, by the UE, the PDCP PDUs, received through the WLAN radio link, to the corresponding PDCP entity in the UE will be described.

For example, the UE may receive information for mapping the PDCP PDUs to the PDCP entity in the UE, together with the PDCP PDUs. As another example, the UE may receive, as header information of the PDCP PDUs, information for mapping the PDCP PDUs to the PDCP entity in the UE. As another example, the UE may receive, as newly added header information, information for mapping the PDCP PDUs to the PDCP entity in the UE. As another example, the UE may receive the information for mapping the PDCP PDUs to the PDCP entity in the UE by including the same in the WLAN MAC header, LLC header, IP header, or UDP header between the WLAN termination including the PDCP PDUs and the UE.

More specifically, when transmitting the PDCP PDUs to the UE through the WLAN radio link (or the WLAN L1/L2 protocol), the PDCP entity of the base station (or the base station) may transmit, to the UE, the information for mapping the PDCP PDUs to the PDCP entity in the UE, together with the PDCP PDUs, or by adding the same to PDCP PDUs, or further by adding the header to the PDCP PDUs.

Alternatively, when transmitting the PDCP PDUs to the aggregation entity, and transmitting the received PDCP PDUs to the UE through the WLAN radio link by the aggregation entity, the PDCP entity of the base station may transmit, to the UE, the information for mapping the PDCP PDUs to the PDCP entity in the UE, together with the PDCP PDUs or by adding the same to the PDCP PDUs, or further by adding a header to the PDCP PDUs. To this end, when the above-mentioned aggregation entity is a functional entity included in the WLAN termination in the scenario where the base station and the WLAN termination are non-co-located, the base station may transmit, to the WLAN termination, the information for mapping the PDCP PDUs to the PDCP entity in the UE if the base station attempts to add the WLAN as one carrier.

Alternatively, the aggregation entity may classify the PDCP PDUs belonging to a specific bearer through the user plane protocol instance. The aggregation entity may transmit, to the UE, the information for mapping PDCP PDUs belonging to a specific bearer to the PDCP entity in the UE, together with the PDCP PDUs or by adding the same to PDCP PDUs, or further by adding a header to the PDCP PDUs.

Alternatively, the PDCP entity of the base station may transmit the PDCP PDUs to the aggregation entity included in the WLAN termination, and the aggregation entity included in the WLAN termination may transmit the received PDCP PDUs to the aggregation entity in the UE, which is peered to the aggregation entity in the WLAN termination through the WLAN radio link.

Alternatively, the PDCP entity of the base station may transmit the PDCP PDUs to the aggregation entity included in the base station, and the aggregation entity included in the base station may transmit the received PDCP PDUs to an aggregation entity included in the UE, which is peered to the aggregation entity included in the base station, through the WLAN termination (or WLAN radio link).

The aggregation entity in the UE may transmit the received PDCP PDUs to the corresponding PDCP entity in the corresponding UE.

To support this, the aggregation entity in the WLAN termination and the aggregation entity in the UE may be configured to be associated with one radio bearer only.

Alternatively, the aggregation entity included in the WLAN termination may transmit the PDCP PDUs by including the same in the information for mapping the PDCP PDUs to the PDCP entity in the UE. That is, the aggregation entity included in the WLAN termination may transmit the PDCP PDUs by including the same in the information for mapping the PDCP PDUs to the PDCP entity in the UE, and the aggregation entity in the UE may transmit the PDCP PDUs to the corresponding PDCP entity by using the information.

Alternatively, the aggregation entity included in the base station may transmit the PDCP PDUs by including the same in the information for mapping the PDCP PDUs to the PDCP entity in the UE. That is, the aggregation entity included in the base station may transmit the PDCP PDUs together with (by including) the information for mapping the PDCP PDUs to the PDCP entity in the UE, and the aggregation entity in the UE may transmit the PDCP PDUs to the corresponding PDCP entity, using the information.

Meanwhile, the information for mapping the PDCP PDUs to the PDCP entity in the UE may be included in the corresponding PDCP PDUs. That is, data received through the WLAN carrier may include identification information for transmitting the data, received through the WLAN carrier, to the PDCP entity of the specific bearer within the UE.

It may be preferable that the information for mapping the PDCP PDUs to the PDCP entity in the UE uses the corresponding radio bearer as identification information.

For example, the information for mapping the PDCP PDUs to the PDCP entity in the UE may use a logical Channel Identity having a value between 3 and 10. As another example, the eps-Bearer Identity may be used as the information for mapping the PDCP PDUs to the PDCP entity in the UE. As another example, the dRB-Identity may be used as the information for mapping the PDCP PDUs to the PDCP entity in the UE. As another example, index information capable of identifying the corresponding radio bearer may be newly defined and used as the information for mapping the PDCP PDUs to the PDCP entity in the UE, and it may be configured that index information capable of identifying the radio bearer to be added in DRB configuration information (DRB-ToAddMod) in the UE.

The UE may establish another aggregation entity in the UE, which is peered to the aggregation entity. Alternatively, the UE may establish, in the PDCP entity, another aggregation entity in the UE, which is peered to the aggregation entity. Alternatively, the UE may provide a function of mapping the PDCP PDUs, received through the WLAN termination (or WLAN radio link), to the corresponding PDCP PDUs in the PDCP layer. Alternatively, the UE may provide a function of mapping the PDCP PDUs, received through the WLAN termination (or WLAN radio link), to the corresponding PDCP PDUs.

The UE may perform reordering of the PDCP PDUs, which is received by the PDCP entity through the WLAN termination (or a WLAN radio link) and transferred to the corresponding PDCP entity in the UE, and the PDCP PDUs, which is received through a base station radio link and transferred to the PDCP entity through an RLC entity, according to the PDCP sequence number. Accordingly, the transmission of the user plane data may be performed in ordered sequence in the PDCP entity.

As described above, the information for setting up an entity that provides an operation for dividing the data, received through the WLAN carrier, for each specific bearer may be included in the configuration information for configuring a specific bearer through the WLAN carrier by the UE.

Figure 4:
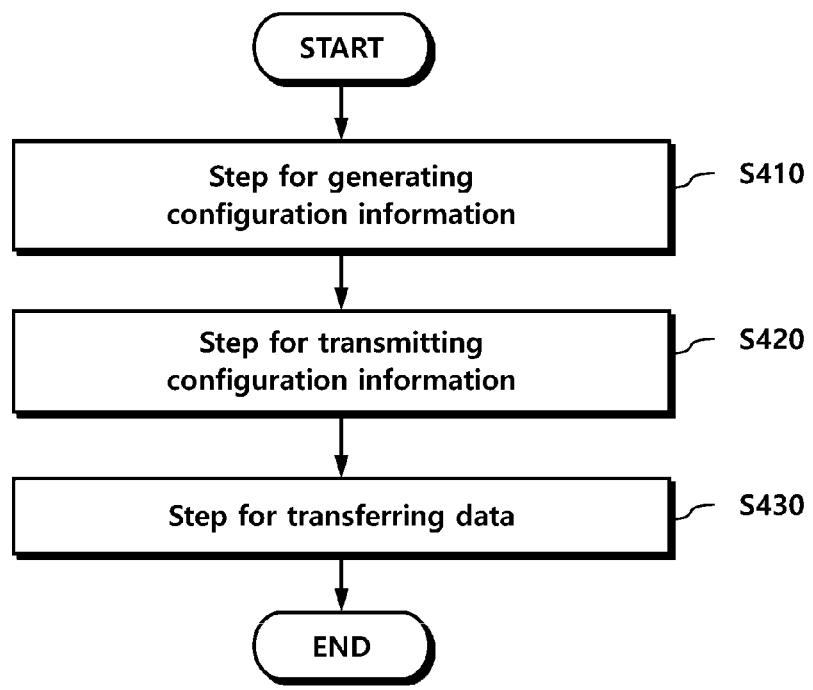
FIG. 4 is a diagram illustrating operations of a base station according to another embodiment of the present disclosure.

FIG. 4 is a diagram illustrating operations of a base station according to an embodiment of the present disclosure.

According to an embodiment of the present disclosure, a method may be provided for transmitting data using a WLAN carrier by a base station. The method may include: generating configuration information for configuring a specific bearer through a WLAN carrier; transmitting the configuration information to a UE; and transferring, to a WLAN termination, data to be transmitted through the WLAN carrier.

Referring to FIG. 4, the base station may perform an operation of generating configuration information for configuring a specific bearer through a WLAN carrier (S410). The configuration information may include information for setting, in the UE, an entity that provides an operation of dividing the data, transmitted through the WLAN carrier, for each specific bearer. As described above, the UE may transmit data, received through the WLAN carrier, to the corresponding PDCP entity in the UE. To this end, the base station may generate configuration information for setting, by the UE, an entity that provides an operation of dividing the data, received through the WLAN carrier, for each specific bearer. For example, the entity that provides the operation of dividing data based on each specific bearer may be the entity in the UE, which is peered to the aggregation entity. Alternatively, the entity that provides the operation of dividing data based on each specific bearer may be an entity that performs a function of dividing the received data for each specific bearer.

The base station may perform an operation of transmitting the configuration information to the UE (S420). The base station may transmit the configuration information to the UE. The configuration information may also be transmitted through higher layer signaling.

The base station may perform an operation of transmitting data to be transmitted through the WLAN carrier to the WLAN termination (S430). As described above, the data transmitted to the WLAN termination may be transmitted through the GTP-U protocol between the base station and the WLAN termination providing the WLAN carrier. For example, the base station may transmit the PDCP PDUs, which is transmitted to the UE through the WLAN carrier, to the aggregation entity configured in the WLAN termination. Alternatively, the PDCP entity of the base station may transmit the PDCP PDUs, which is transmitted to the UE through the WLAN carrier, to the aggregation entity configured in the WLAN termination.

On the other hand, data transmitted through the WLAN carrier may include identification information for transmitting, by the UE, the data received through the WLAN carrier to the PDCP entity of the specific bearer within the UE. In addition, the identification information may include one of logical channel identifier information, bearer identification information, and wireless bearer index information.

In addition, the base station may perform any operations necessary to implement each embodiment of the present disclosure.

As described above, according to the present disclosure, in order for the UE to transmit user plane data using the E-UTRAN carrier and the WLAN carrier at the same time, the E-UTRAN may split the user plane data in the PDCP entity in units of radio bearers and transmits the user plane date through the WLAN radio link. Further, the UE may transfer the PDCP PDUs, received through the WLAN radio link, to the corresponding PDCP entity in the UE, to have an effect of transmitting user plane data in units of radio bearers by adding the WLAN carrier in the E-UTRAN.

Figure 5:
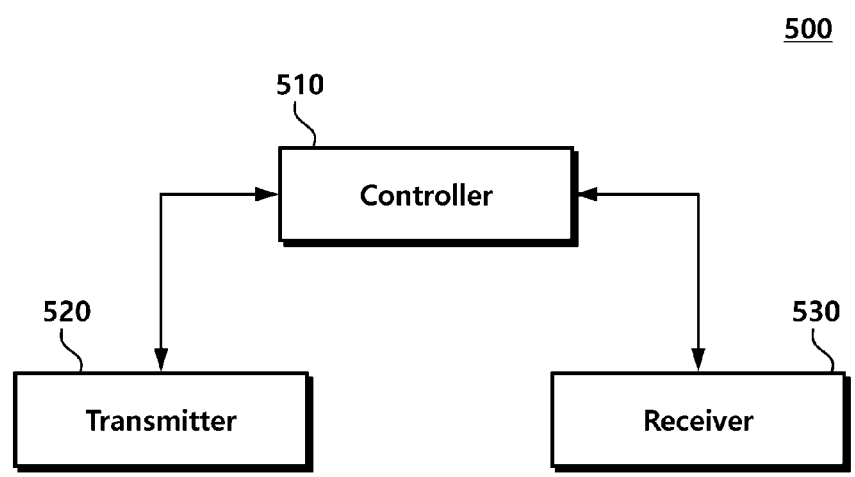
FIG. 5 is a diagram showing a configuration of a UE according to still another embodiment of the present disclosure.

FIG. 5 is a diagram showing a configuration of a UE according to an embodiment of the present disclosure.

Referring to FIG. 5, in accordance with at least one embodiment, a user equipment 500 includes: a transmitter 520 for transmitting WLAN MAC address information or IP address information, which is configured in the UE; a receiver 530 for receiving configuration information for configuring a specific bearer through a WLAN carrier, and receiving data through each of the base station and the WLAN carrier; and a controller 510 for transferring data of a specific bearer, received through the WLAN carrier, to a PDCP entity of a specific bearer within the UE.

In addition, the controller 510 controls an overall operation of the UE 500, which is required by the UE to perform operations of receiving data through the WLAN carrier and transmitting the data to the corresponding PDCP entity in accordance with at least one embodiment of the present disclosure described above.

The transmitter 520 may transmit the WLAN MAC address or the IP address information to the base station or the WLAN termination. Further, the transmitter 520 may transmit the same to the aggregation entity. In addition, the transmitter 520 transmits uplink control information, uplink data, and a message to the base station through the corresponding channel.

The receiver 530 may receive configuration information for configuring the specific bearer through the WLAN carrier. The configuration information may include information for setting an entity that provides an operation of dividing the data, received through the WLAN carrier, for each specific bearer. In addition, the receiver 530 may receive data including identification information for transferring the data, received through the WLAN carrier, to the PDCP entity of the specific bearer within the UE. The identification information may include one of logical channel identifier information, bearer identification information, and wireless bearer index information.

In addition, the receiver 530 may receive, from a base station, downlink control information, downlink data, and a message through a corresponding channel.

Figure 6:
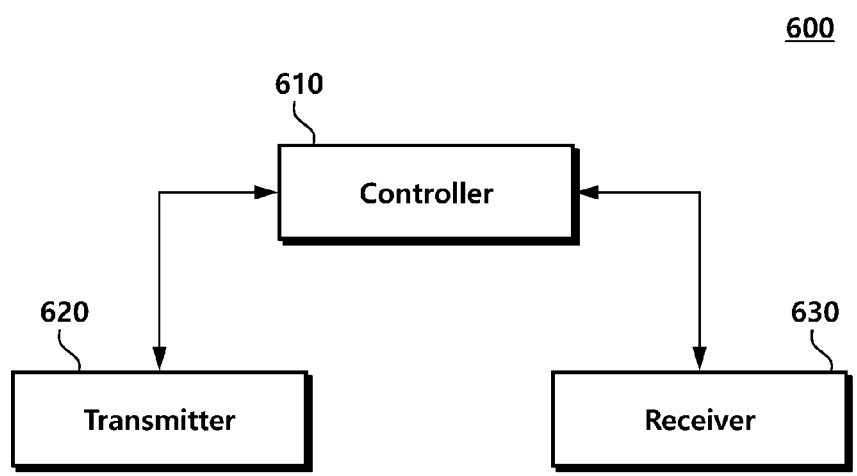
FIG. 6 is a diagram showing a configuration of a base station according to still another embodiment of the present disclosure.

FIG. 6 is a diagram showing a configuration of a base station according to an embodiment of the present disclosure.

Referring to FIG. 6, a base station 600 may include a controller 610 for generating configuration information for configuring a specific bearer through a WLAN carrier, and a transmitter 620 for transmitting the configuration information to the UE and transmitting data to be transmitted through the WLAN carrier to the WLAN termination. The configuration information may include information for setting an entity that provides an operation of dividing the data, received through the WLAN carrier, for each specific bearer.

The transmitter 620 may transmit, to the WLAN termination, data to be transmitted to the UE through the WLAN carrier or WLAN MAC address information or IP address information of the UE. The data transmitted to the WLAN termination may be transferred through the GTP-U protocol between the base station and the WLAN termination providing the WLAN carrier. In addition, data transmitted through the WLAN carrier may include identification information for transferring, by the UE, the data received through the WLAN carrier to the PDCP entity of the specific bearer within the UE. On the other hand, the identification information may include one of logical channel identifier information, bearer identification information, and wireless bearer index information.

Meanwhile, the base station may further include a receiver 630 for receiving uplink signals and data from the UE.

The transmitter 620 and the receiver 630 are used for transmitting/receiving a signal, a message, and data needed for performing the present disclosure to/from the UE.

In addition, the controller 610 controls an overall operation of the base station 600, which is required by the UE to perform operations of receiving data through the WLAN carrier and transmitting the data to the corresponding PDCP entity in the present disclosure described above.

In addition, the controller 610 controls the overall operation of the base station, necessary for implementing the embodiments of the present disclosure.

Although a preferred embodiment of the present disclosure has been described for illustrative purposes, those skilled in the art will appreciate that various modifications, additions and substitutions are possible without departing from the scope and spirit of the invention as disclosed in the accompanying claims. Therefore, exemplary aspects of the present disclosure have not been described for limiting purposes. The scope of the present disclosure shall be construed based on the accompanying claims in such a manner that all of the technical ideas included within the scope equivalent to the claims belong to the present disclosure.

The invention claimed is:

1. A method for receiving, by a user equipment (UE), data by aggregating a wireless local area network (WLAN) carrier, the method comprising:
    configuring a first aggregation entity within a UE to process data received through a WLAN carrier;
    receiving data through at least one of a base station and the WLAN carrier; and
    transferring, by the first aggregation entity, the received data of a specific bearer to a data packet convergence protocol (PDCP) entity of a specific bearer within the UE, wherein the data of the specific bearer is received through the WLAN carrier,
    wherein the data received through the WLAN carrier includes bearer identification information to be used to determine a corresponding PDCP entity to which the received data is transferred,
    wherein the transferring includes:
    determining, by the first aggregation entity, the PDCP entity corresponding to the specific bearer of the data received through the WLAN carrier, based on the bearer identification information included in the received data; and
    transferring, by the first aggregation entity, the received data to the determined PDCP entity, and
    wherein the bearer identification information includes one of a data radio bearer (DRB) identity and wireless bearer index information.

2. The method of claim 1, wherein the first aggregation entity is configured to correspond to a second aggregation entity which is configured in the base station.

3. The method of claim 1, wherein the first aggregation entity is configured in a lower layer of the PDCP entity within the UE.

4. A method for transmitting data using a wireless local area network (WLAN) carrier by a base station, the method comprising:
    configuring a second aggregation entity within a base station to process data to be transmitted through a WLAN carrier;
    receiving, from a packet data convergence protocol (PDCP) entity, data to be transmitted through the WLAN carrier, and adding identification information thereto, by the second aggregation entity; and
    transmitting, by the second aggregation entity, the data to be transmitted through the WLAN carrier to a first aggregation entity using the WLAN carrier, wherein the first aggregation entity is configured within the UE,
    wherein the identification information includes bearer identification information to be used, by the first aggregation entity, to determine a corresponding PDCP entity of a specific bearer to which the first aggregation entity in the UE transfers the data received through the WLAN carrier, and
    wherein the bearer identification information includes one of a data radio bearer (DRB) identity and wireless bearer index information.

5. The method of claim 4, wherein the second aggregation entity is configured to correspond to the first aggregation entity which is configured in the UE.

6. The method of claim 4, wherein the second aggregation entity is configured in a lower layer of the PDCP entity within the base station.

7. A user equipment (UE) for receiving data by aggregating a wireless local area network (WLAN) carrier, the UE comprising:
- a controller configured to configure a first aggregation entity within a UE to process data received through a WLAN carrier; and
- a receiver configured to receive data through at least one of a base station and the WLAN carrier, wherein the controller controls the first aggregation entity to transfer the data of a specific bearer, received through the WLAN carrier, to a packet data convergence protocol (PDCP) entity of a specific bearer within the UE,
- wherein the data received through the WLAN carrier includes bearer identification information to be used to determine a corresponding PDCP entity to which the received data is transferred; and
- wherein the transferring of the first aggregation entity includes:
  - determining, by the first aggregation entity, the PDCP entity corresponding to the specific bearer of the data received through the WLAN carrier, based on the bearer identification information included in the received data; and
  - transferring, by the first aggregation entity, the received data to the determined PDCP entity, and
- wherein the bearer identification information includes one of a data radio bearer (DRB) identity and wireless bearer index information.

8. The UE of claim 7, wherein the first aggregation entity is configured to correspond to a second aggregation entity which is configured in the base station.

9. The UE of claim 7, wherein the first aggregation entity is configured in a lower layer of the PDCP entity within the UE.

* * * * *